United States Patent
Jeong et al.

(10) Patent No.: US 10,353,587 B2
(45) Date of Patent: Jul. 16, 2019

(54) DATA STORAGE DEVICE AND METHOD OF PROCESSING DATA THEREOF

(71) Applicant: SAMSUNG ELECTRONICS CO., LTD., Suwon-si, Gyeonggi-Do (KR)

(72) Inventors: Taemin Jeong, Seoul (KR); Soonjae Won, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 652 days.

(21) Appl. No.: 14/800,843

(22) Filed: Jul. 16, 2015

(65) Prior Publication Data

US 2016/0026388 A1 Jan. 28, 2016

(30) Foreign Application Priority Data

Jul. 24, 2014 (KR) .................. 10-2014-0094190

(51) Int. Cl.
*G06F 3/00* (2006.01)
*G06F 7/08* (2006.01)
*G06F 3/06* (2006.01)

(52) U.S. Cl.
CPC ............ *G06F 3/061* (2013.01); *G06F 3/0659* (2013.01); *G06F 3/0688* (2013.01)

(58) Field of Classification Search
CPC .... G06F 3/0659; G06F 3/0631; G06F 3/0626; G06F 2212/7203; G06F 12/0862; G06F 9/30047; G06F 3/061; G06F 9/30145; G06F 2205/106; G06F 9/383; G06F 9/3802; G06F 9/3836; G06F 2212/6028; H04L 49/901; H04L 49/90
See application file for complete search history.

(56) References Cited

U.S. PATENT DOCUMENTS

| 5,918,073 A * | 6/1999 | Hewitt ................ G06F 3/061 377/47 |
| 6,049,842 A | 4/2000 | Garrett et al. |
| 6,519,722 B1 * | 2/2003 | Wiggins ................ G06F 5/06 714/707 |
| 7,159,048 B2 | 1/2007 | Roach et al. |
| 7,212,599 B2 * | 5/2007 | Subrahmanyan ......... G06F 5/12 370/516 |

(Continued)

FOREIGN PATENT DOCUMENTS

JP 2005-258509 9/2005

*Primary Examiner* — Tuan V Thai
*Assistant Examiner* — Candice A Rankin
(74) *Attorney, Agent, or Firm* — F. Chau & Associates, LLC

(57) ABSTRACT

A method of operating a data storage device includes fetching a first plurality of commands from at least one submission queue generated in a host memory, determining whether a ratio of a second plurality of commands from among the fetched first plurality of commands exceeds a reference ratio, and adjusting a number of a plurality of pointers being fetched at substantially a same time based on determining whether the ratio exceeds the reference ratio. The second plurality of commands has a same property, the plurality of pointers indicates a physical address of the host memory corresponding to the first plurality of commands, and the data storage device includes a storage controller configured to perform an interfacing operation with a host including the host memory.

20 Claims, 12 Drawing Sheets

(56) References Cited

U.S. PATENT DOCUMENTS

| | | |
|---|---|---|
| 7,299,302 B2 | 11/2007 | Muro |
| 7,424,562 B2 | 9/2008 | Srinivasan et al. |
| 7,844,777 B2 | 11/2010 | Guok et al. |
| 7,877,524 B1 | 1/2011 | Annem et al. |
| 2006/0158554 A1* | 7/2006 | Cho ........................ G09G 5/005 |
| | | 348/537 |
| 2008/0016021 A1* | 1/2008 | Gulbeden ......... G06F 17/30171 |
| 2008/0320176 A1 | 12/2008 | Gao et al. |
| 2009/0037689 A1 | 2/2009 | Kanuri |
| 2013/0086311 A1 | 4/2013 | Huang et al. |
| 2015/0254022 A1* | 9/2015 | Oikawa ................. G06F 3/0659 |
| | | 711/103 |

* cited by examiner

DATA STORAGE DEVICE AND METHOD OF PROCESSING DATA THEREOF

CROSS-REFERENCE TO RELATED APPLICATIONS

This application claims priority under 35 U.S.C. § 119 to Korean Patent Application No. 10-2014-0094190, filed on Jul. 24, 2014, the disclosure of which is incorporated by reference herein in its entirety.

TECHNICAL FIELD

Exemplary embodiments of the inventive concept relate to a data storage device, and more particularly, to a data storage device and a method of processing data thereof.

DISCUSSION OF THE RELATED ART

A solid state drive (SSD) is a typical example of a data storage device based on a flash memory device. Examples of interfaces used in a data storage device such as an SSD include, for example, a SATA interface, a PCIe interface, a SAS interface, etc. The performance of SSD devices is gradually being improved while the quantity of data being processed is gradually increased. However, since a conventional interface such as a SATA interface is designed for storage devices such as an HDD device and is not specialized for a data processing device such as an SSD device, limitations in performance of the SSD device may occur.

SUMMARY

Exemplary embodiments of the inventive concept provide a method of operating a data storage device. The method may include fetching commands from at least one submission queue generated in a host memory, determining whether a ratio of commands having a same property from among the fetched commands exceeds a reference ratio, and adjusting the number of pointers being fetched at the same time on the basis of the determination result. The pointers indicate a physical address of the host memory corresponding to the commands.

Exemplary embodiments of the inventive concept provide a data storage device. The data storage device may include a nonvolatile memory and a storage controller. The storage controller may be configured to fetch commands from at least one submission queue of a host memory and to fetch pointers indicating a physical address of a memory. The pointers correspond to the commands. The storage controller is configured to control the number of pointers being fetched at the same time depending on whether a ratio of commands having the same property from among the fetched commands exceeds a reference ratio.

Exemplary embodiments of the inventive concept provide a data storage device. The data storage device may fetch commands from at least one submission queue of a host memory, and adjust the number of pointers being fetched at the same time in a case in which a ratio of commands having the same property from among the fetched commands exceeds a reference ratio. The pointers indicate a physical address of the host memory corresponding to the commands.

In an exemplary embodiment of the inventive concept, a method of operating a data storage device includes fetching a first plurality of commands from at least one submission queue generated in a host memory, and determining whether a ratio of a second plurality of commands from among the fetched first plurality of commands exceeds a reference ratio. The second plurality of commands has a same property. The method further includes adjusting a number of a plurality of pointers being fetched at substantially a same time based on determining whether the ratio exceeds the reference ratio. The plurality of pointers indicates a physical address of the host memory corresponding to the first plurality of commands, and the data storage device includes a storage controller configured to perform an interfacing operation with a host comprising the host memory.

In an exemplary embodiment of the inventive concept, a data storage device includes a nonvolatile memory and a storage controller. The storage controller is configured to fetch a first plurality of commands from at least one submission queue of a host memory, and fetch a plurality of pointers indicating a physical address of the host memory. The plurality of pointers corresponds to the first plurality of commands. The storage controller is configured to control a number of the plurality of pointers being fetched at substantially a same time based on determining whether a ratio of a second plurality of commands from among the first plurality of commands exceeds a reference ratio. The second plurality of commands has a same property.

In an exemplary embodiment of the inventive concept, a method of operating a data storage device includes fetching a plurality of commands from at least one submission queue of a host memory, and adjusting a number of a plurality of pointers being fetched at substantially a same time in response to determining that a ratio of commands from among the plurality of commands having a same property exceeds a reference ratio. The plurality of pointers indicates a physical address of the host memory corresponding to the plurality of commands.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF EXEMPLARY EMBODIMENTS

Figure 1:
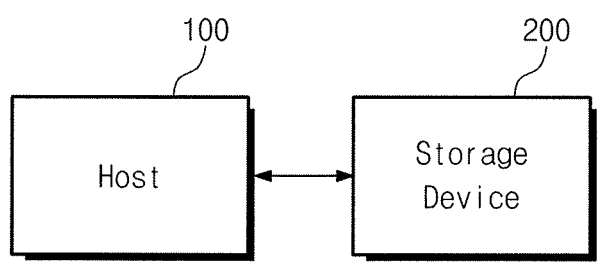
FIG. 1 is a block diagram illustrating a user device according to an exemplary embodiment of the inventive concept.

Exemplary embodiments of the present inventive concept will be described more fully hereinafter with reference to the accompanying drawings. Like reference numerals may refer to like elements throughout the accompanying drawings. Herein, when events are described as occurring at substantially the same time, it is to be understood that the events may occur at exactly the same time or at about the same time as would be understood by a person having ordinary skill in the art.

FIG. 1 is a block diagram illustrating a user device according to exemplary embodiments of the inventive concept. Referring to FIG. 1, a user device may include a host 100 and a data storage device 200.

The host 100 may transmit data to the data storage device 200 or read data stored in the data storage device 200. When a read request or a write request occurs, the host 100 generates a command. The command may be generated in a submission queue in a host memory. The submission queue may be, for example, a circular buffer in which a command is stored after the command is generated in the host 100. The command may be stored in the submission queue until the command is executed. If the command is executed, a completion signal for notifying a state of a command which was completely executed may be stored in the completion queue of the host memory. Together, the submission queue and the completion queue form one set. The submission queue and the completion queue may include a plurality of entries. For example, a plurality of submission queue entries (e.g., a plurality of commands) may be stored in the submission queue, and a plurality of completion signals representing that a command is completely executed may be stored in the completion queue.

In a case in which the command generated in the submission queue is a command according to a write request, data to be transmitted and a pointer having address information of a space in which data is stored may be loaded in the host memory at substantially the same time. The pointer may have address information of a space in the host memory in which data to be read from the data storage device 200 is temporarily stored.

A plurality of pointers may be loaded. Alternatively, a list pointer indicating a set of pointers may be loaded. In a case in which the list pointer is loaded, the list pointer may have address information of a space in the host memory in which other pointers are stored. For example, in a case in which exemplary embodiments of the inventive concept are applied to a data storage device based on NVMe (Non-Volatile Memory Express), the pointers may be a PRP entry (physical region page entry) or an SGL descriptor (scatter-gather list descriptor). However, exemplary embodiments of the inventive concept are not limited to the NVMe implementation, and the pointer is not limited to the PRP entry or the SGL descriptor. The pointer may designate a PRP entry or a data structure similar to an SGL descriptor prescribed in an NVMe specification.

The data storage device 200 may fetch a command from the host 100. In a case in which the fetched command is a command relating to a write request, the data storage device 200 may fetch a pointer stored in the host memory. According to exemplary embodiments, a pointer generated together with a command may be fetched, and a list pointer generated together with a command may be fetched. Data may be transmitted from the host 100 to the data storage device 200 with reference to address information in the host memory 110 corresponding to the fetched pointer. A similar situation may exist in a case in which a command according to a read request is fetched. In this case, however, data may be loaded to a specific address in the host memory 110 as indicated by the fetched pointers.

The data storage device 200 may adjust the number of pointers being fetched at substantially the same time by judging whether a ratio of pointers having the same property from among pointers being fetched exceeds a reference ratio. The data storage device 200 may also selectively fetch a pointer by giving a priority order to a pointer being fetched.

For example, in a case in which commands related to a write operation exceed the reference ratio, the number of pointers being fetched at substantially the same time may be reduced. In a case in which commands related to a read operation exceed the reference ratio, the number of pointers being fetched at substantially the same time may be increased. In a case in which a ratio of pointers not related to a read operation and a write operation exceeds the reference ratio, the number of pointers being fetched at substantially the same time may be increased. As a result, a limited resource(s) of the data storage device may be efficiently used, and performance of the data storage device may be improved.

Figure 2:
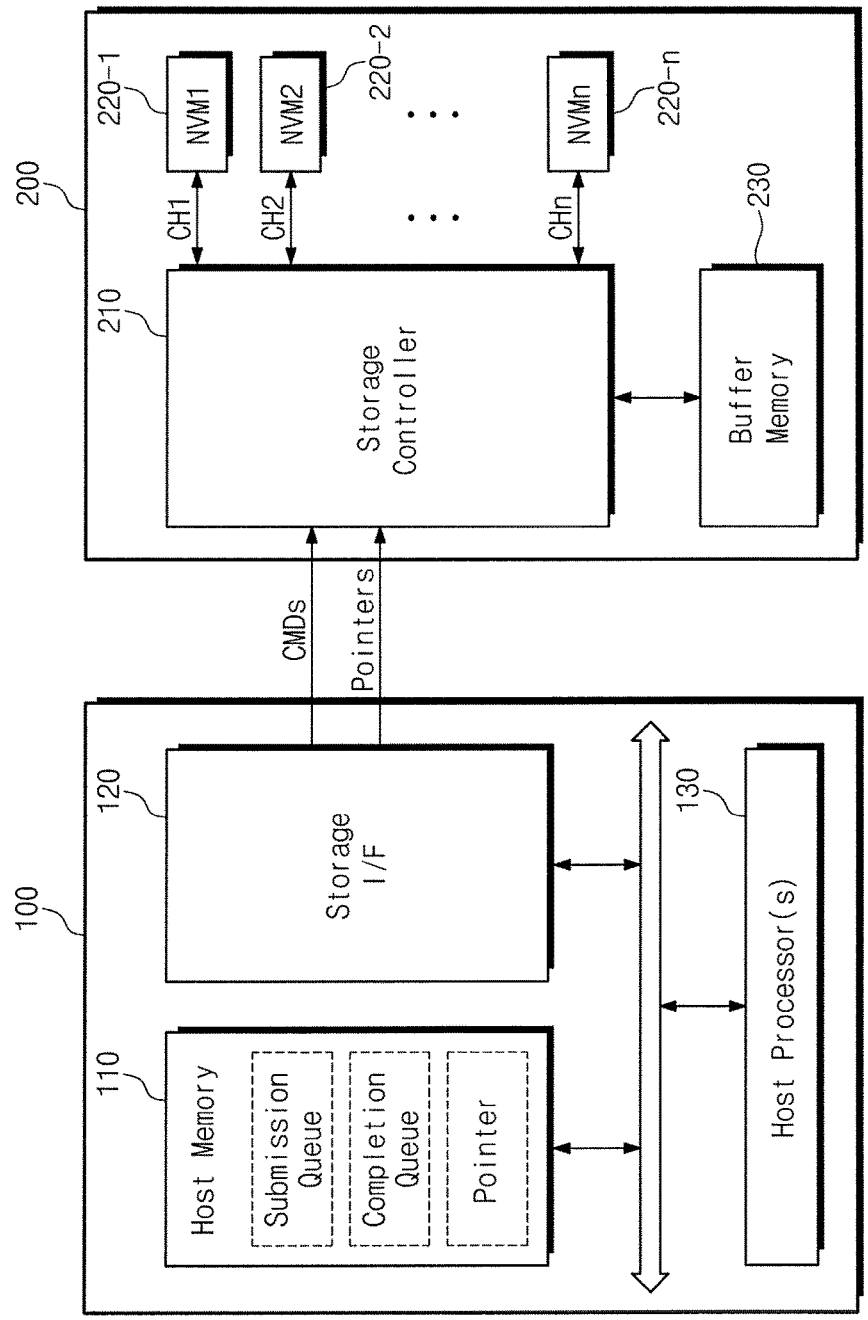
FIG. 2 is a block diagram illustrating an exemplary embodiment of the user device illustrated in FIG. 1.

FIG. 2 is a block diagram illustrating an exemplary embodiment of the user device illustrated in FIG. 1. Referring to FIG. 2, the user device may include the host 100 and the data storage device 200.

The host 100 may include a host memory 110, a storage interface 120 and at least one processor 130.

A submission queue and a completion queue may be included in the host memory 110. Pairs of the submission queue and the completion queue may be provided. Generated commands are stored in the submission queue, and the commands are stored until an execution of the command is completed. Information indicating whether an execution of the command has been completed is stored in the completion queue. If information indicating that an execution of the command has been completed is stored in the completion queue, a command of the submission queue corresponding thereto may be deleted.

After a command has been generated in the submission queue, a pointer corresponding to the generated command may be generated in the host memory 110. The pointer may include information regarding a physical address of the host memory 110 in which data to be programmed is stored, or a physical address of the host memory 110 in which data to be read from the data storage device 200 is stored. For example, in a case in which exemplary embodiments of the inventive concept are applied to a data storage device performing interfacing on the basis of NVMe, the pointer may a PRP entry, an SGL descriptor, or a data structure similar thereto.

In a case in which the host memory 110 is used as a working memory, an application program, a file system, a device driver, etc., data may be loaded in the host memory 110. In a case in which the host memory 110 is used as a temporary buffer for transmitting data to the data storage device 200, the data may be stored in the host memory 110. Although one host memory is illustrated in FIG. 2, a plurality of host memories may be provided in the host 100. The host memory 110 may be a volatile memory such as, for example, an SRAM (static random-access memory), a DRAM (dynamic random-access memory), an SDRAM (synchronous dynamic random access memory), etc., a nonvolatile memory such as, for example, a PRAM (parameter random access memory), an MRAM (magnetoresistive random-access memory), an RRAM (resistive random-access memory), an FRAM (ferroelectric random-access memory), etc., or a combination thereof.

The storage interface 120 may provide a physical interface between the host 100 and the data storage device 200. The storage interface 120 may transmit a command, an address, data, etc. that are generated according to various requests to the data storage device 200. An interfacing method of the storage interface 120 may utilize, for example, NVMe interfacing on the basis of PCIe (PCI express) interfacing. However, the storage interface 120 is not limited thereto. The storage interface 120 may be a type of interface which enables transmission and reception of data by fetching a command generated in the host memory and then fetching a pointer indicating a physical address of the host memory corresponding to the generated command.

The host processor 130 may execute software (e.g., an application program, an operating system, a device driver, etc.) in the host 100. For example, the host processor 130 can execute an operating system (OS) and an application program being loaded in the host memory 110. Under the control of the host processor 130, data to be programmed in the data storage device 200 may be stored in the host memory 110 or data to be read from the data storage device 200 may be stored in the host memory 110. Exemplary embodiments may include a plurality of host processors 130.

The data storage device 200 may include a storage controller 210, a plurality of nonvolatile memories 220-1 through 220-n, and a buffer memory 230. The plurality of nonvolatile memories 220-1 through 220-n may be collectively referred to as a nonvolatile memory 220.

The storage controller 210 may provide an interface between the host 100 and the data storage device 200. The storage controller 210 may adjust the number of pointers being fetched at substantially the same time by determining whether commands having the same property from among commands being fetched from the host 100 exceed a reference ratio. For example, in a case in which commands related to a write operation exceed the reference ratio, the storage controller 210 may reduce the number of pointers being fetched at substantially the same time. In a case in which commands related to a read operation exceed the reference ratio, the storage controller 210 may increase the number of pointers being fetched at substantially the same time. In a case in which a ratio of commands (e.g., commands related to a system setting(s)) not related to a read operation and a write operation exceeds the reference ratio, the storage controller 210 may increase the number of pointers being fetched at substantially the same time.

In a case in which the storage controller 210 executes a command related to a write operation, the storage controller 210 may fetch a pointer corresponding to a fetched command. The storage controller 210 may access the buffer memory 230 to program data in the nonvolatile memories 220-1 through 220-n. The storage controller 210 receives write data from a region in the host memory 110 as indicated by the fetched pointer.

In a case in which the storage controller 210 executes a command related to a read operation, the storage controller 210 may fetch a pointer corresponding to the fetched command. Under the control of the storage controller 210, to transmit data to the host 100, data may be loaded in the buffer memory 230 by accessing the nonvolatile memories 220-1 through 220-n. The storage controller 210 transmits read data to a region in the host memory 110 as indicated by the fetched pointer.

According to exemplary embodiments of the present inventive concept, the data processing operation may be performed according to an NVMe interfacing method on the basis of PCIe. However, the interfacing method is not limited thereto. The interfacing method may be applied to any interfacing method that enables transmission and reception of data by fetching a command generated in the host memory 110 and then fetching a pointer indicating a physical address of the host memory 110 corresponding to the generated command.

The nonvolatile memories 220-1 through 220-n may include, for example, any one of a flash memory, a PRAM, an MRAM, an RRAM, an FRAM, etc., or may be constituted by a combination thereof.

In a case in which a read operation or a write operation is executed, the buffer memory 230 may perform a function of a buffer in which read or write data is temporarily stored. The buffer memory 230 may be, for example, a DRAM. However, the buffer memory 230 is not limited thereto. The buffer memory 230 may be a volatile memory such as, for example, an SRAM, an SDRAM, etc., or may be constituted by a combination thereof.

Figure 3:
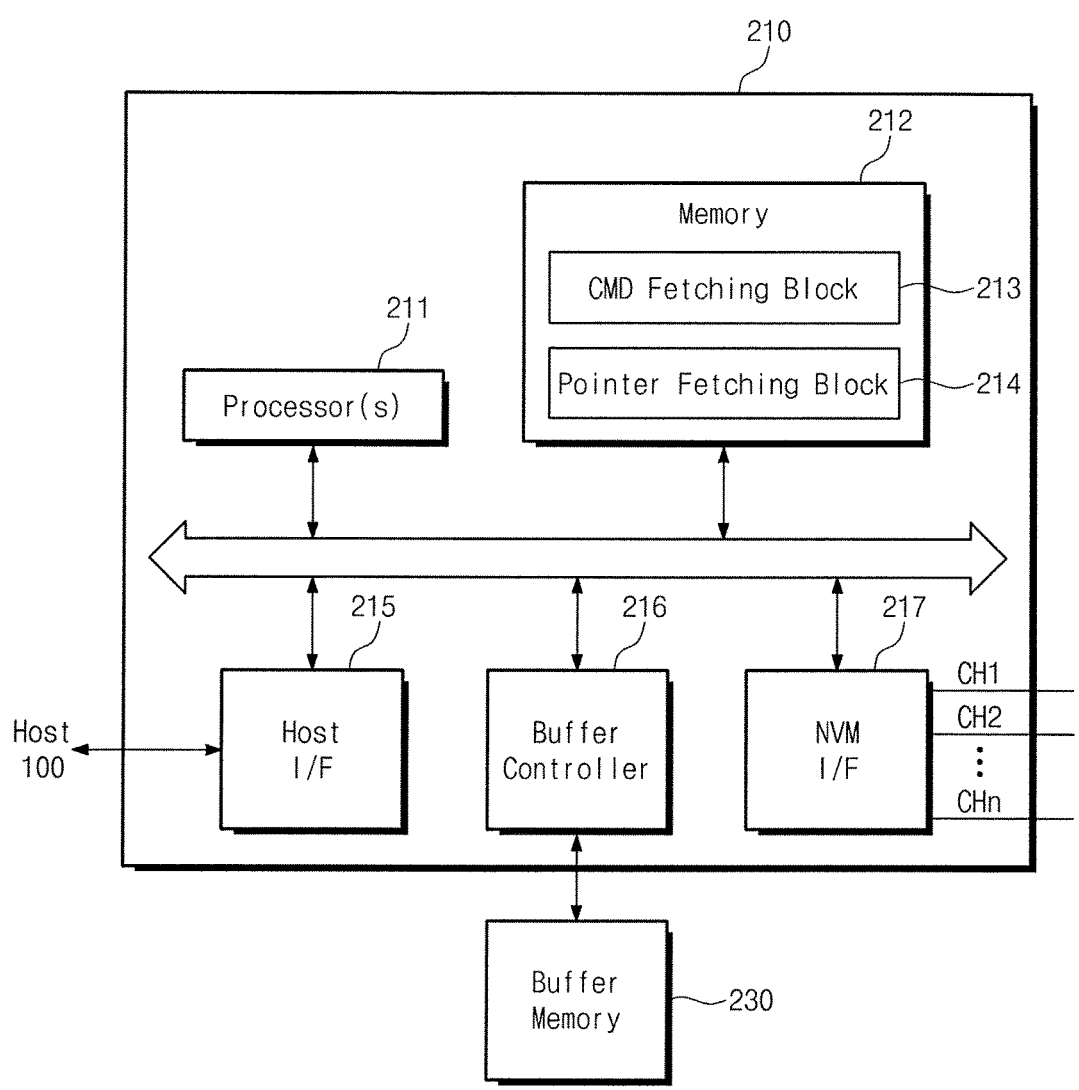
FIG. 3 is a block diagram illustrating an example of the storage controller illustrated in FIG. 2 according to an exemplary embodiment of the inventive concept.

FIG. 3 is a block diagram illustrating an example of the storage controller 210 illustrated in FIG. 2 according to an exemplary embodiment of the inventive concept. Referring to FIG. 3, the storage controller 210 may include at least one of a processor 211, a memory 212, a host interface 215, a buffer controller 216 (e.g., an ECC (error-correcting code) circuit), and an NVM interface 217.

The processor 211 may control an overall operation related to a read or write operation received from the host 100. For example, under the control of the processor 211, various information needed in a read or write operation may be stored in the memory 212. The various information needed in a read or write operation may include, for example, commands or pointers fetched from the host memory 110. The pointer may be, for example, a PRP entry (physical region page entry), an SGL descriptor (scatter gather list descriptor), or a structure similar thereto. According to exemplary embodiments, the storage controller 210 may include a plurality of processors 211.

The memory 212 may store commands related to various read or write commands, and pointers received from the host 100. The memory 212 may include a command fetching block 213 in which a command is stored and a pointer fetching block 214 in which pointers are stored. Although the command fetching block 213 and the pointer fetching block 214 are embodied in one memory 212, they may be embodied by a separate register disposed external to the memory 212.

The host interface 215 may provide an interface between the host 100 and the data storage device 200. An interfacing method performed by the host 100 may utilize, for example, an NVMe interfacing implementation on the basis of PCIe.

In a program operation, under the control of the buffer controller 216, data being programmed in the nonvolatile memory 220 may be temporarily stored in the buffer memory 230. In a read operation, under the control of the buffer controller 216, data read from the nonvolatile memory 220 may be temporarily stored in the buffer memory 230.

The NVM interface 217 may exchange data with the nonvolatile memories 220-1 through 220-n. The NVM interface 217 may transmit data being transmitted from the buffer memory 230 to the nonvolatile memories 220-1 through 220-n through channels CH1 through CHn respectively. Read data being provided through the channels CH1 through CHn from the nonvolatile memories 220-1 through 220-n may be stored in the buffer memory 230 through the NVM interface 217.

The processor 211 may adjust the number of pointers being fetched at substantially the same time by determining whether commands having the same property from among commands stored in the command fetching block 213 exceed a reference ratio. For example, in a case in which a ratio of commands (e.g., commands related to a system setting(s)) not related to performance (e.g., a read or write operation) exceeds the reference ratio, the processor 211 may change the number of pointers being fetched at substantially the same time. This is because those commands may have less of an effect on the load on a system as compared with commands related to performance. In a case in which commands related to a write operation exceed the reference ratio, the processor 211 may reduce the number of pointers being fetched at substantially the same time. In a case in which commands related to a read operation exceed the reference ratio, the processor 211 may increase the number of pointers being fetched at substantially the same time. As a result, a limited resource of the data storage device may be efficiently used, and performance of the data storage device may be improved.

Figure 4:
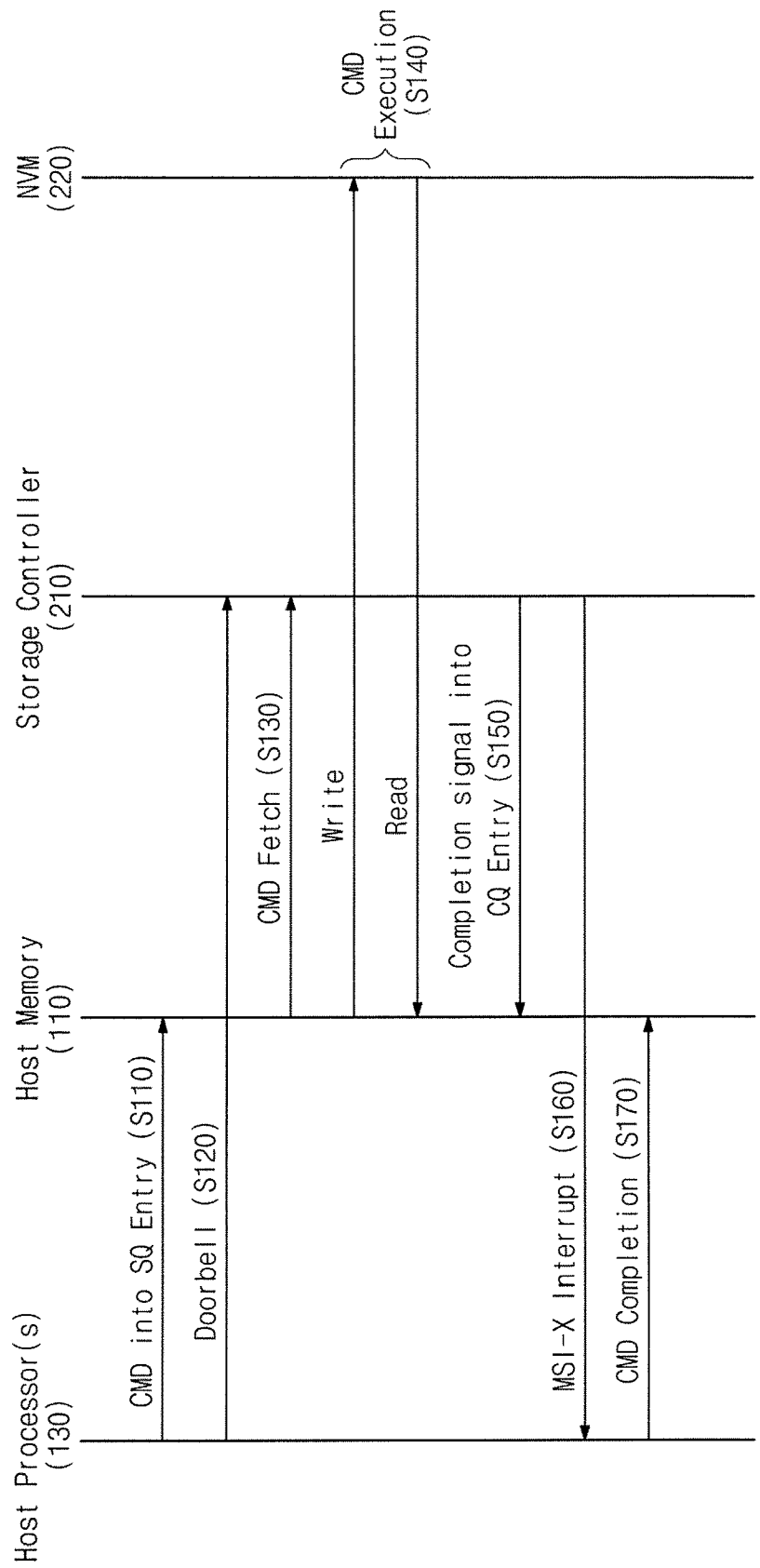
FIG. 4 is a flowchart illustrating an operation of a data storage device according to exemplary embodiments of the inventive concept.

FIG. 4 is a flowchart illustrating an operation of a data storage device according to exemplary embodiments of the inventive concept.

Referring to FIG. 4, in operation S110, the host processor 130 may generate a command and dispose the generated command in a submission queue (SQ). For example, the commands may be disposed in the submission queue by host software driven in the host memory 110 by the host processor 130.

Figure 5:
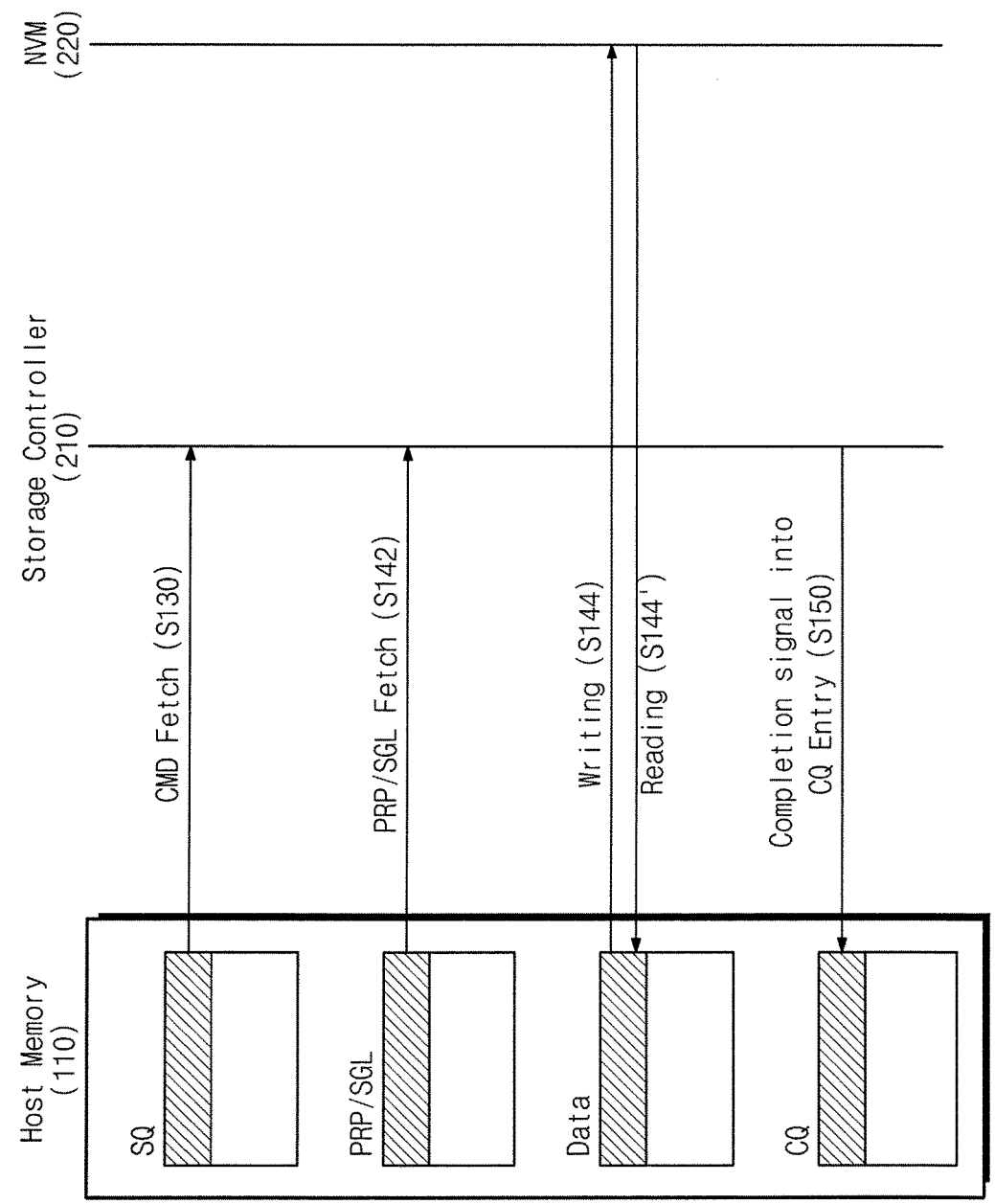
FIG. 5 is a flowchart illustrating operation S140 of FIG. 4 in further detail according to an exemplary embodiment of the inventive concept.

If the generated command is a command related to a read/write operation, the host processor 130 may generate a pointer (e.g., a PRP entry or an SGL descriptor) in the host memory 110 (refer to the area represented by "PRP/SGL" in FIG. 5). A space of the memory indicated by the pointer may also be set (refer to the area represented by "Data" in FIG. 5). If the generated pointer is a pointer related to a write operation, the pointer may indicate a space of the host memory 110 in which data to be transmitted to the nonvolatile memory 220 is stored.

In operation S120, the host processor 130 may transmit a doorbell to the storage controller 210. The doorbell is a type of interrupt, and may be utilized to perform a function of providing a notification regarding the preparation of executing an operation (e.g., a read/write operation) in accordance with the generated command.

In operation S130, the storage controller 210 may fetch a command(s) from the host memory 110. The command(s) may include, for example, a high priority command or an urgent command such as, for example, a command related to a system setting. The command may also include a command related to a read/write operation.

The number of pointers being fetched at substantially the same time may be adjusted depending on whether commands having the same property from among fetched commands exceed a reference ratio. In a case in which a ratio of commands related to a write operation exceeds the reference ratio, the number of pointers being fetched at substantially the same time may be reduced. In a case in which a ratio of commands related to a read operation exceed the reference ratio, the number of pointers being fetched at substantially the same time may be increased. Although the commands are related to a read or write operation, an order of pointers being fetched may be adjusted based on the size of data being programmed.

In operation S140, the storage controller 210 may execute a fetched command. Operation S140 may include, for example, fetching a pointer. The storage controller 210 may not fetch all of the pointers corresponding to the fetched command. For example, the storage controller 210 may fetch pointers according to the number of pointers being fetched at substantially the same time in accordance with operation S130. Although FIG. 4 illustrates execution of a command related to a read operation and a write operation, exemplary embodiments are not limited thereto. For example, other commands such as, for example, a command related to a system setting, may be further included.

In a case in which a command is related to a read operation, the storage controller 210 may read data stored in the nonvolatile memory 220 and may transfer the data to the host memory 110 with reference to the fetched pointer. At this time, a number of commands corresponding to the number of pointers being fetched at substantially the same time, which may be adjusted in operation S130, may be executed at substantially the same time.

In a case in which a command is related to a write operation, under the control of the storage controller 210, data stored in the host memory 110 may be programmed in the nonvolatile memory 220 with reference to the fetched pointer. At this time, a number of commands corresponding to the number of pointers being fetched at substantially the same time, which may be set in operation S130, may be executed at substantially the same time.

In operation S150, the storage controller 210 may transfer a completion signal to the host memory 110. The completion signal is a signal notifying that an execution of a command is completed and may be transferred to a completion queue (CQ) generated in the host memory 110.

In operation S160, the storage controller 210 may transfer a message signaled interrupt (e.g., an MSI-X interrupt) to the host processor 130. The MSI-X interrupt indicates that an execution of a command is completed to the host processor 130, and in this regard, is similar to a doorbell.

In operation S170, the host processor 130 may transfer a command completion message to the host memory 110.

FIG. 5 is a flowchart illustrating operation S140 of FIG. 4 in further detail according to an exemplary embodiment of the inventive concept.

As described above, in operation S130, the storage controller 210 may fetch commands.

In operation S142, the storage controller 210 may fetch pointers (e.g., a PRP entry or an SGL descriptor). This is applicable, for example, in a case in which a fetched command is related to a read/write operation. The storage controller 210 may fetch pointers according to the number of pointers being fetched at substantially the same time in accordance with operation S130.

In operations S144 and S144', the storage controller 210 may execute the fetched command. In the case of executing a command related to a write operation, under the control of the storage controller 210, data stored in the nonvolatile memory 220 may be transferred to the host memory 110 with reference to the fetched pointer. In the case of executing a command related to a read operation, under the control of the storage controller 210, data stored in the host memory 110 may be transferred to the nonvolatile memory 220 with reference to the fetched pointer.

In operation S150, the storage controller 210 may transfer a completion signal to the host memory 110. The completion signal may be stored in the completion queue (CQ) of the host memory 110, and the executed command may be removed from the submission queue (SQ). As a result, the host recognizes that the execution of a corresponding command is completed.

Figure 6:
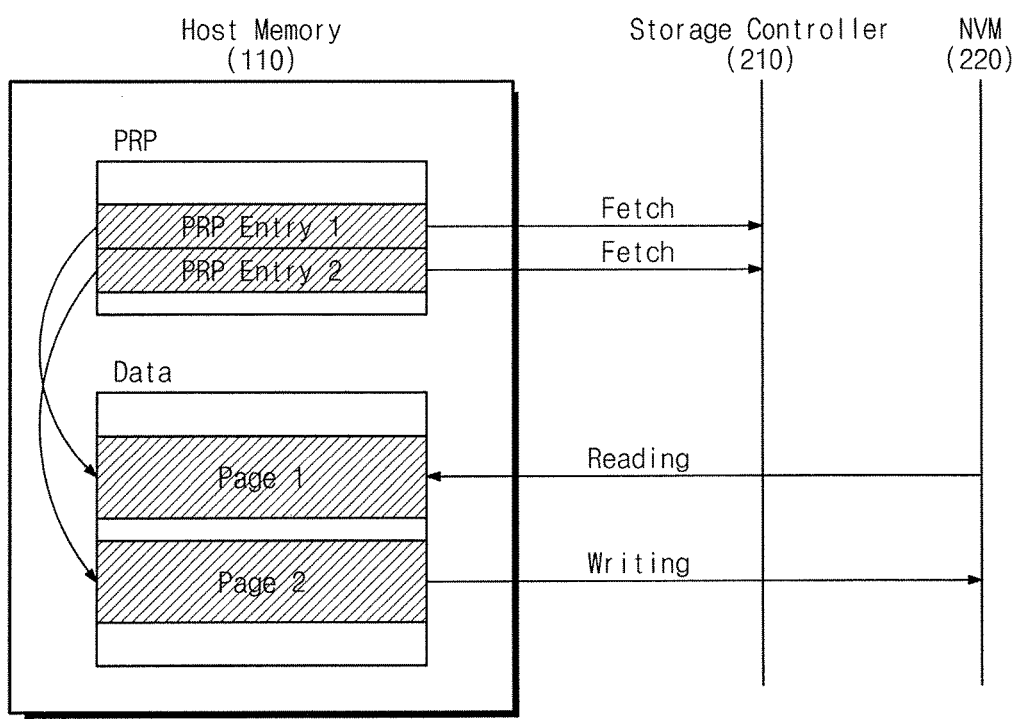
FIG. 6 illustrates an operation method of the data storage device according to exemplary embodiments of the inventive concept.

FIG. 6 illustrates an operation method of the data storage device 200 according to exemplary embodiments of the inventive concept.

Referring to FIG. 6, if a command issue occurs, a command may be disposed in a submission queue. In a case in which a command is related to a read or write operation, pointers (e.g., a PRP entry or an SGL descriptor) may be generated. If the command is related to a read operation, a space (e.g., Page 1) in the host memory indicated by PRP Entry 1 may be secured. The secured space (e.g., Page 1) may be a place in which data to be read from the nonvolatile memory 220 of the data storage device 200 is stored. In a case in which a command is related to a write operation, program data may be stored in a space (e.g., Page 2) in the host memory 110 indicated by PRP Entry 2. In FIG. 6, a case in which a command related to a read or write operation is generated is described as an exemplary illustration. In a case in which a command related to a system setting is generated, a pointer (e.g., a PRP entry or an SGL descriptor) may not be generated.

The storage controller 210 may fetch PRP Entry 1 and PRP Entry 2. The storage controller 210 may perform a read or write operation with reference to address information as indicated by the respective PRP entry. For example, in the case of a read operation, under the control of the storage controller 210, data stored in the nonvolatile memory 220 may be transferred to the space (Page 1) in the host memory 110 as indicated by PRP Entry 1. In the case of a write operation, under the control of the storage controller 210, data stored in the space (Page 2) in the host memory 110 as indicated by PRP Entry 2 is transferred to the nonvolatile memory 220. The fetched entries stored in the storage controller 210 may be deleted simultaneously with the transmission of data such as a read or write operation.

Figure 7:
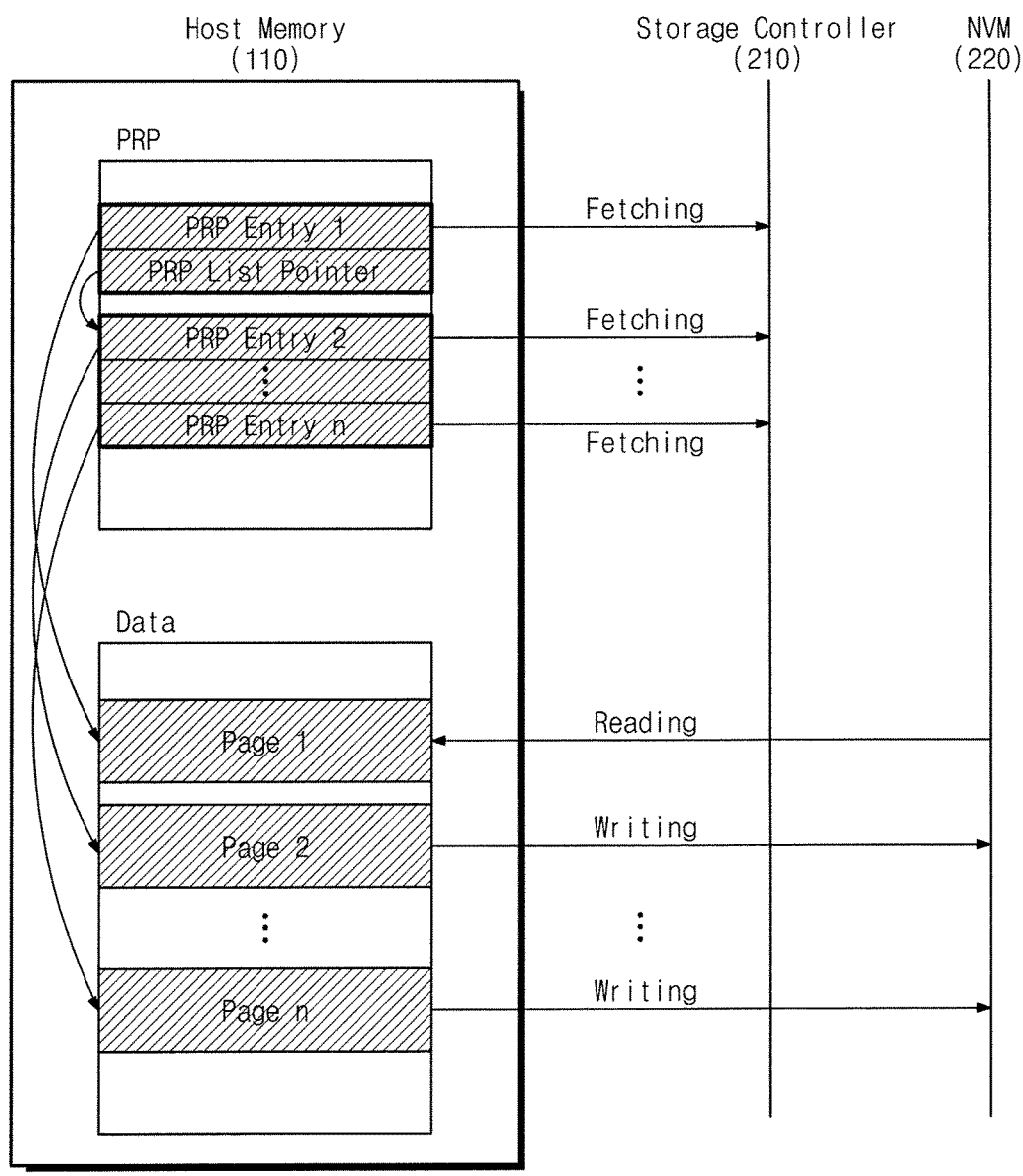
FIG. 7 illustrates an operation method of the data storage device according to exemplary embodiments of the inventive concept.

FIG. 7 illustrates an operation method of the data storage device 200 according to exemplary embodiments of the inventive concept.

Referring to FIG. 7, a PRP entry or a PRP list pointer corresponding to a generated command may be generated. The PRP list pointer may indicate an address in which other PRP entries are stored. The PRP list pointer may be generated to read out large amounts of data or efficiently perform a program operation.

If a command issue occurs, a command may be disposed in a submission queue. In a case in which a command is related to a read or write operation, pointers (e.g., a PRP entry, a PRP list pointer or an SGL descriptor) may be generated. If the command is related to a read operation, a space (e.g., Page 1) in the host memory 110 as indicated by PRP Entry 1 may be secured. The secured space (Page 1) may be a place in which data to be read from the nonvolatile memory 220 of the data storage device 200 is stored. In a case in which a command is related to a write operation, a PRP list pointer may be generated. The PRP list pointer may have address information of the host memory 110 in which PRP Entries 2 through n are stored. The PRP Entries 2 through n may have address information of pages 2 through n of the host memory 110, respectively. Data to be programmed in the nonvolatile memory 220 in the data storage device 200 may be stored in Pages 2 through n.

The storage controller 210 may then fetch PRP Entries 1 through n. The storage controller 210 may perform a read or write operation with reference to address information as indicated by the corresponding PRP entry. For example, in the case of a read operation, under the control of the storage controller 210, data stored in the nonvolatile memory 220 may be transferred to the space (Page 1) in the host memory 110 as indicated by PRP Entry 1. In the case of a write operation, under the control of the storage controller 210, data stored in the space (Pages 2 through n) in the host memory 110 is transferred to the nonvolatile memory 220. The fetched entries stored in the storage controller 210 may be deleted simultaneously with the transmission of data, such as a read or write operation. As shown in FIG. 7, in an exemplary embodiment, referring to a write operation, the PRP list pointer may be generated. According to exemplary embodiments, even in a case in which large amounts of data are efficiently read from the data storage device 200 at substantially the same time, the PRP list pointer may be generated.

Figure 8:
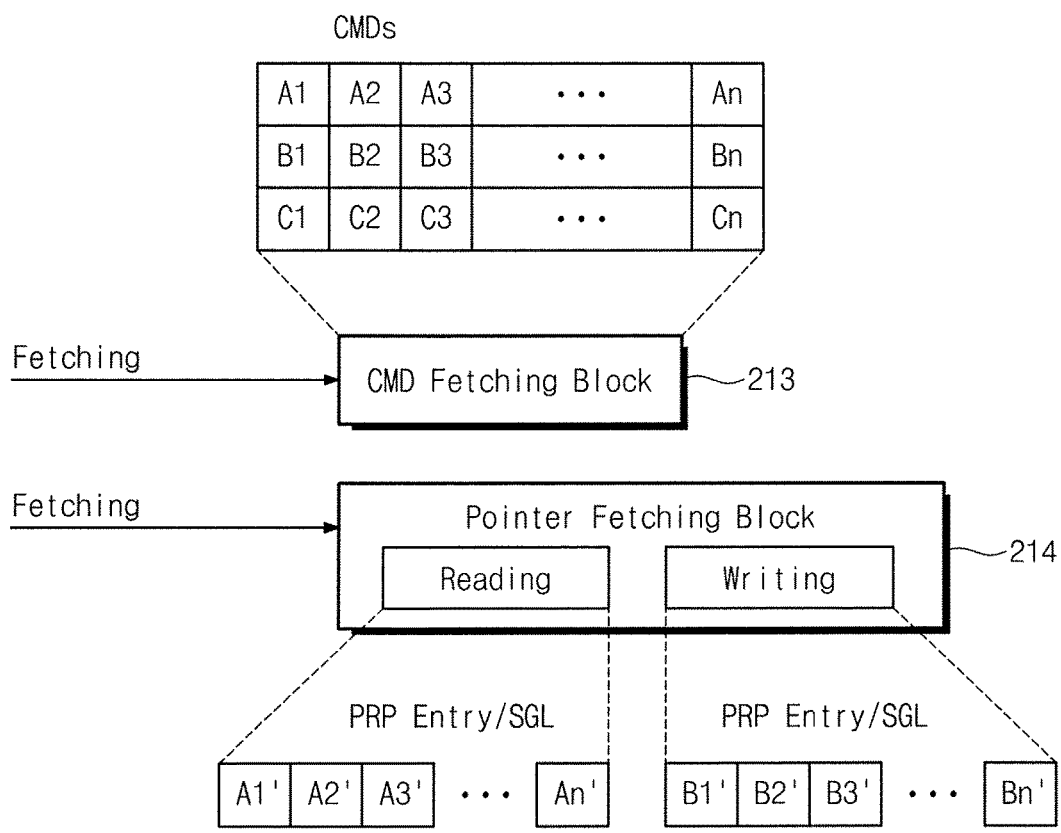
FIG. 8 is a block diagram illustrating an operation method of the data storage device according to exemplary embodiments of the inventive concept.

FIG. 8 is a block diagram illustrating an operation method of the data storage device 200 according to exemplary embodiments of the inventive concept.

Referring to FIG. 3 together with FIG. 8, the memory 212 in the storage controller 210 may include the command fetching block 213 and the pointer fetching block 214. In FIGS. 3 and 8, the command fetching block 213 and the pointer fetching block 214 are embodied inside the memory 212. According to exemplary embodiments, the command fetching block 213 and the pointer fetching block 214 may be embodied as a separate register in the storage controller 210. In a case in which exemplary embodiments are applied to a data storage device 200 that performs interfacing on the basis of NVMe, the pointer fetching block 214 may fetch a PRP entry, an SGL descriptor, or a data structure similar thereto.

Commands fetched from the host memory 110 may be stored in the command fetching block 213. The fetched commands may include commands (A1 through An) related to a read operation and commands (C1 through Cn) related to a system setting. However, the types of commands being fetched is not limited thereto.

Pointers fetched from the host memory 110 may be stored in the pointer fetching block 214. The number of pointers being fetched may be adjusted depending on whether commands having the same property from among fetched commands exceed a reference ratio. The pointer fetching block 214 may store pointers (A1' through An') related to a read operation and pointers (B1' through Bn') related to a write operation.

In a case in which commands (C1 through Cn) related to a system setting are fetched, the storage controller 210 may give the top priority to those commands. Thus, the commands (C1 through Cn) related to a system setting may be executed before commands related to a read or write operation. In a case in which commands (C1 through Cn) related to a system setting are fetched, pointers (e.g., a PRP entry or an SGL descriptor) may not be fetched.

The storage controller 210 may determine the order of pointers (e.g., a PRP entry or an SGL descriptor) being fetched based on the property of the fetched commands. For example, the storage controller 210 may fetch the pointers (A1' through An') related to a read operation before fetching the pointers (B1' through Bn') related to a write operation. If the storage controller 210 fetches the pointers (A1 through An') related to a read operation, under the control of the storage controller 210, read data is transferred from the nonvolatile memory 220 to the host memory 110. Performance of the data storage device as observed by a user may be greatly affected by a response speed with respect to a read operation.

The storage controller 210 may adjust the number of pointers (e.g., a PRP entry or an SGL descriptor) being fetched at substantially the same time from the host 100 with reference to a ratio of commands having the same property from among the fetched commands.

In a case in which commands (A1 through An) related to a read operation exceed the reference ratio, the data storage device 200 may increase the number of pointers being fetched at substantially the same time. In a case in which commands (B1 through Bn) related to a write operation from among the fetched commands exceed the reference ratio, the storage controller 210 may reduce the number of pointers being fetched at substantially the same time. In a case in which commands (C1 through Cn) related to a system setting from among the fetched commands exceed the reference ratio, the data storage device 200 may increase the number of pointers being fetched at substantially the same time. The reference ratio may be determined, for example, by a vendor during a product shipping operation, and may be arbitrarily changed by a user in consideration of a resource of the data storage device 200.

The storage controller 210 may determine the order of pointers (e.g., a PRP entry or an SGL descriptor) in consideration of the property of commands related to a fetched write operation.

For example, suppose that a ratio of commands related to a read operation from among fetched commands exceeds the reference ratio and thereby the number of pointers being fetched at substantially the same time is increased. In an exemplary scenario, suppose that among pointers related to a write operation in FIG. 8, data corresponding to B1' has the smallest size, and as progressing to Bn', a size of the corresponding data becomes larger. Under the control of the storage controller 210, a fetching operation starts with the pointer B1' corresponding to the smallest data. This is because the time it takes to process data corresponding to the pointers B1' and B2' is shorter than the time it takes to process data corresponding to the pointers Bn'−1 and Bn'.

In an exemplary scenario, suppose that a ratio of commands related to a write operation from among fetched commands exceeds the reference ratio and thereby the number of pointers being fetched at substantially the same time is reduced. Under the control of the storage controller 210, a fetching operation starts with the pointer Bn' corresponding to the largest data. Since it takes a relatively long amount of time to process data corresponding to Bn', the data storage device 200 may be in a state in which it cannot fetch a lot of pointers at substantially the same time. This is because, in an exemplary embodiment, even when fetching a lot of pointers (e.g., pointers except pointers corresponding to relatively large amounts of data such as Bn'−1, Bn') at substantially the same time, the data storage device cannot 200 process the pointers at once.

Even in a case in which a command is fetched but pointers corresponding to the command are not yet fetched, size information of data corresponding to the pointer may be included in the command. Thus, when analyzing the property of the command, the storage controller 210 may selectively fetch pointers in consideration of a size of data to be processed. The data storage device 200 adjusts the number of pointers being fetched at substantially the same time with reference to whether a ratio of commands having the same property from among fetched commands exceeds the reference ratio. The data storage device 200 determines the order of pointers being fetched according to the property of the fetched command. As a result, a limited resource of the data storage device 200 may be efficiently used.

Figure 9:
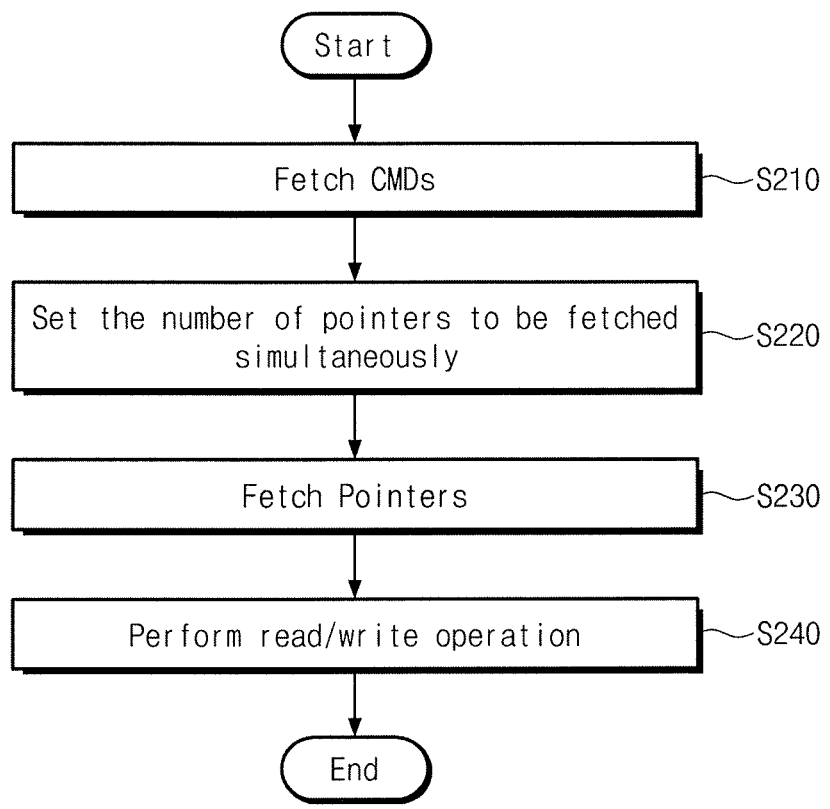
FIG. 9 is a flowchart illustrating an operation method of the data storage device according to exemplary embodiments of the inventive concept.

FIG. 9 is a flowchart illustrating an operation method of the data storage device 200 according to exemplary embodiments of the inventive concept.

In operation S210, if a command is generated in a submission queue of the host memory 110, the storage controller 210 may fetch commands from the host memory 110. The fetched command may be, for example, a command related to a system setting or a command related to performance such as, for example, a read/write operation. The method of fetching a command may be determined by a system setting, a vendor mechanism, a user setting, etc. In a case in which exemplary embodiments of the inventive concept are applied to a data storage device 200 performing interfacing on the basis of NVMe, commands may be fetched, for example, by an arbitration prescribed in an NVMe specification.

In operation S220, the number of pointers being fetched substantially at the same time may be determined and set. For example, in a case in which a ratio of commands having the same property from among the fetched commands exceeds the reference ratio, the number of pointers being fetched at substantially the same time may be changed.

In operation S230, the storage controller 210 may fetch pointers. The number of pointers being fetched corresponds to the number of pointers set in operation S220. For example, in a case in which a ratio of commands related to a write operation exceeds the reference ratio, a reduced number of pointers may be fetched. In a case in which a ratio of commands related to a read operation exceeds the reference ratio, an increased number of pointers may be fetched. In a case in which commands not related to a read operation and a write operation exceed the reference ratio, an increased number of pointers may be fetched.

In operation S240, a read or write operation may be performed. In an exemplary embodiment, since commands related to a system setting from among the fetched commands may be more important than other commands, those commands may be preferentially executed, and a read operation may then be executed. This is because a user may feel that performance is most affected by a response speed in accordance with a read operation execution. After the read operation is executed, a write operation may then be executed.

According to exemplary embodiments of the inventive concept, the number of pointers being fetched at substantially the same time is controlled depending on whether commands having the same property from among the fetched commands exceed the reference ratio. As a result, a limited resource of the data storage device 200 may be efficiently used and performance may be improved.

Figure 10:
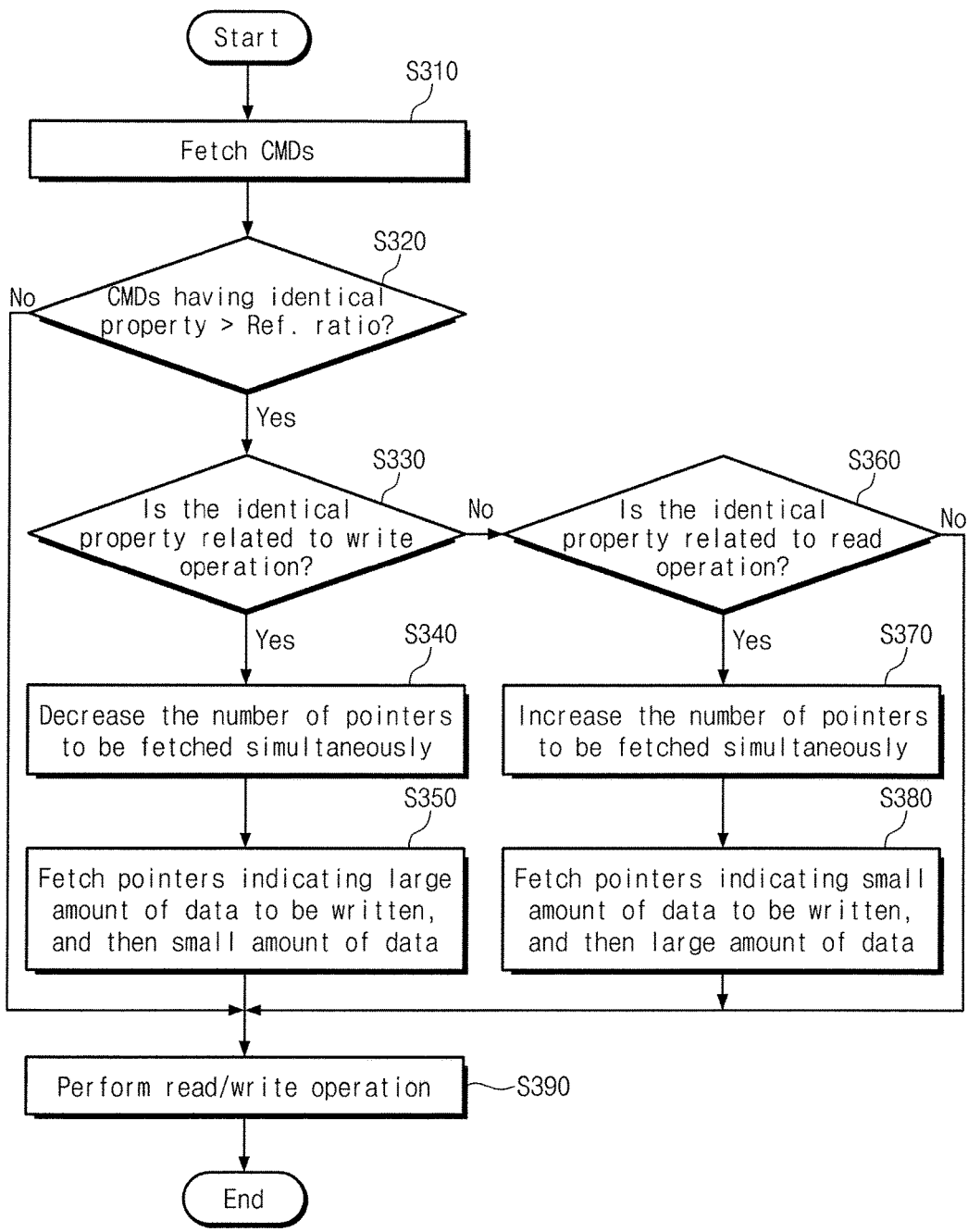
FIG. 10 is a flowchart illustrating an operation method of the data storage device according to exemplary embodiments of the inventive concept.

FIG. 10 is a flowchart illustrating an operation method of the data storage device 200 according to exemplary embodiments of the inventive concept.

In operation S310, commands may be fetched from the host memory 110. This operation is similar to operation S210 of FIG. 9, and thus, a further detailed description is omitted herein.

In operation S320, it is determined whether a ratio of commands having the same property exceeds a reference ratio. The property may refer to, for example, whether a command is related to a read or write operation. In exemplary embodiments, the property may also refer to, for example, whether a command is related to a system setting. However, since commands related to the system setting may be executed as a higher priority before other commands related to performance, as described above, in exemplary embodiments, the property may refer only to whether a command is related to a read or write operation and not whether a command is related to a system setting. An operation division may occur according to the determination result. In a case in which a ratio of commands having the same property exceeds the reference ratio, the method progresses to operation S330. Otherwise, the method progresses to operation S360.

In operation S330, it is determined whether the same property is related to a write operation. An operation division may occur according to the determination result. In a case in which it is determined that the same property is related to a write operation, the method progresses to operation S340. Otherwise, the method progresses to operation S360.

In operation S340, the number of pointers being fetched at substantially the same time is reduced. For example, if commands related to a write operation exceed the reference ratio to be in a fetched state, the system may be greatly loaded. Thus, a load on the system may be reduced by reducing the number of pointers being fetched at substantially the same time.

In operation S350, pointers indicating large amounts of data may be fetched first. The time it takes to execute a read/write command corresponding to large amounts of data is longer than the time it takes to execute a read/write command corresponding to a small amount of data. Since the number of pointers being fetched at substantially the same time is reduced, if pointers corresponding to large amounts of data are preferentially fetched, a limited resource of the system may be more efficiently used.

In operation S360, it is determined whether the same property is related to a read operation. An operation division may occur according to the determination result. In a case in which it is determined that the same property is related to a read operation, the method progresses to operation S370. Otherwise, the method progresses to operation S390.

In operation S370, the number of pointers being fetched at substantially the same time is increased. This is because if commands related to a read operation exceed the reference ratio to be fetched, a relatively small load is to be applied to a system. Thus, the load being applied to the system may be reduced by increasing the number of pointers being fetched at substantially the same time.

In operation S380, pointers indicating a small amount of data may be preferentially fetched. The time it takes to execute a read/write command corresponding to a small amount of data is shorter than the time it takes to execute a read/write command corresponding to a large amount of data. Since the number of pointers being fetched at substantially the same time is increased, if pointers corresponding to a small amount of data are preferentially fetched, a limited resource of the system may be more efficiently used.

In operation S390, a read or write operation may be executed. In an exemplary embodiment, in this operation, a read operation may be preferentially executed. This is because a user may feel that performance is greatly affected by a response speed with respect to the read operation. On the basis of the determination of the previous operation, a read operation of a small or large amount of data may be preferentially executed. After a read operation is executed, a write operation is executed. Similarly, on the basis of the determination of the previous operation, a read operation of a small or large amount of data may be preferentially executed.

Figure 11:
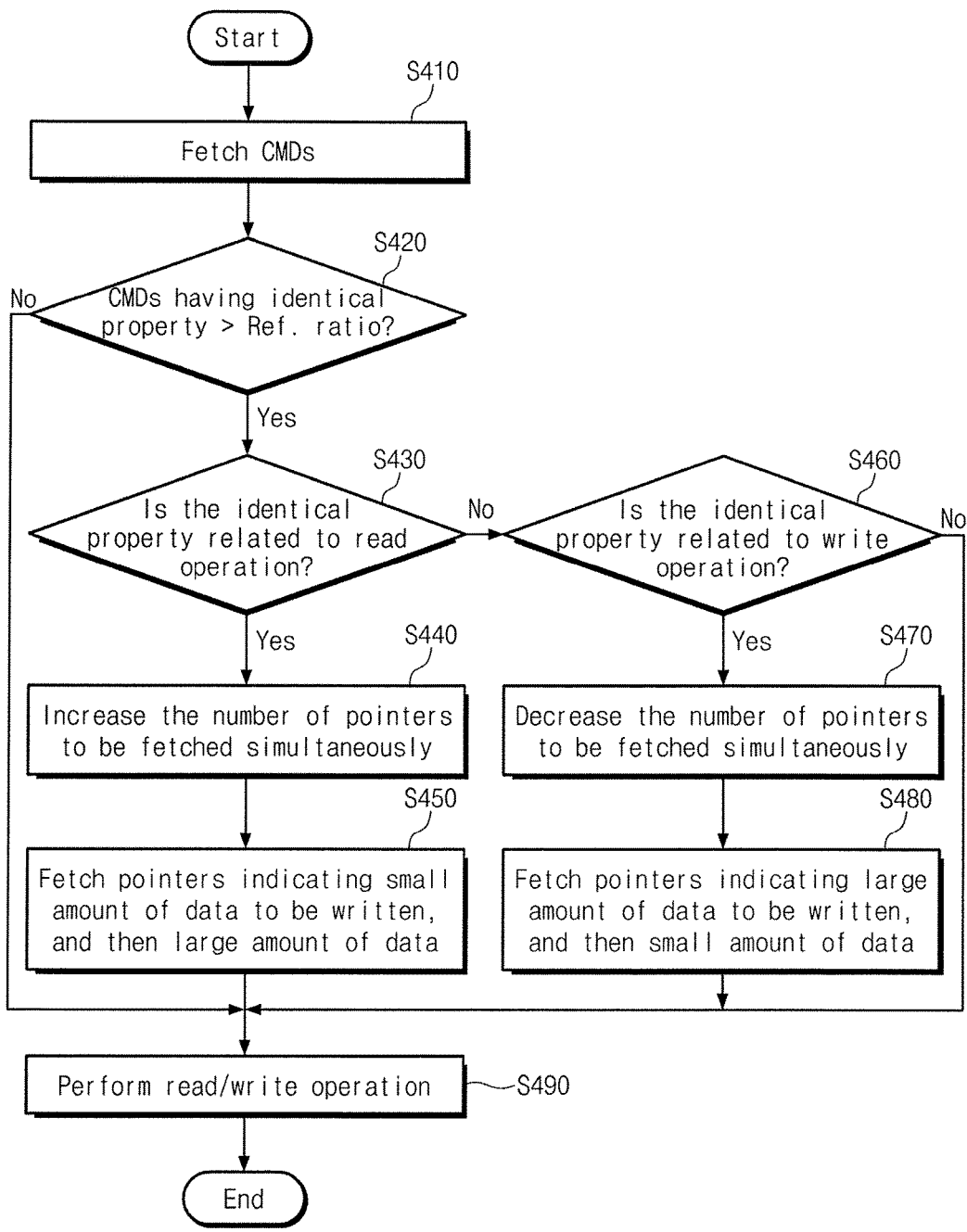
FIG. 11 is a flowchart illustrating an operation method of the data storage device according to exemplary embodiments of the inventive concept.

FIG. 11 is a flowchart illustrating an operation method of the data storage device 200 according to exemplary embodiments of the inventive concept.

The method of FIG. 11 is similar to the method of FIG. 10. Accordingly, only differences between the methods are described herein, and a further detailed description is omitted. For example, in FIG. 11, determining whether the same property is related to a read operation in operation S430 is performed before determining whether the same property is related to a write operation in operation S460.

Figure 12:
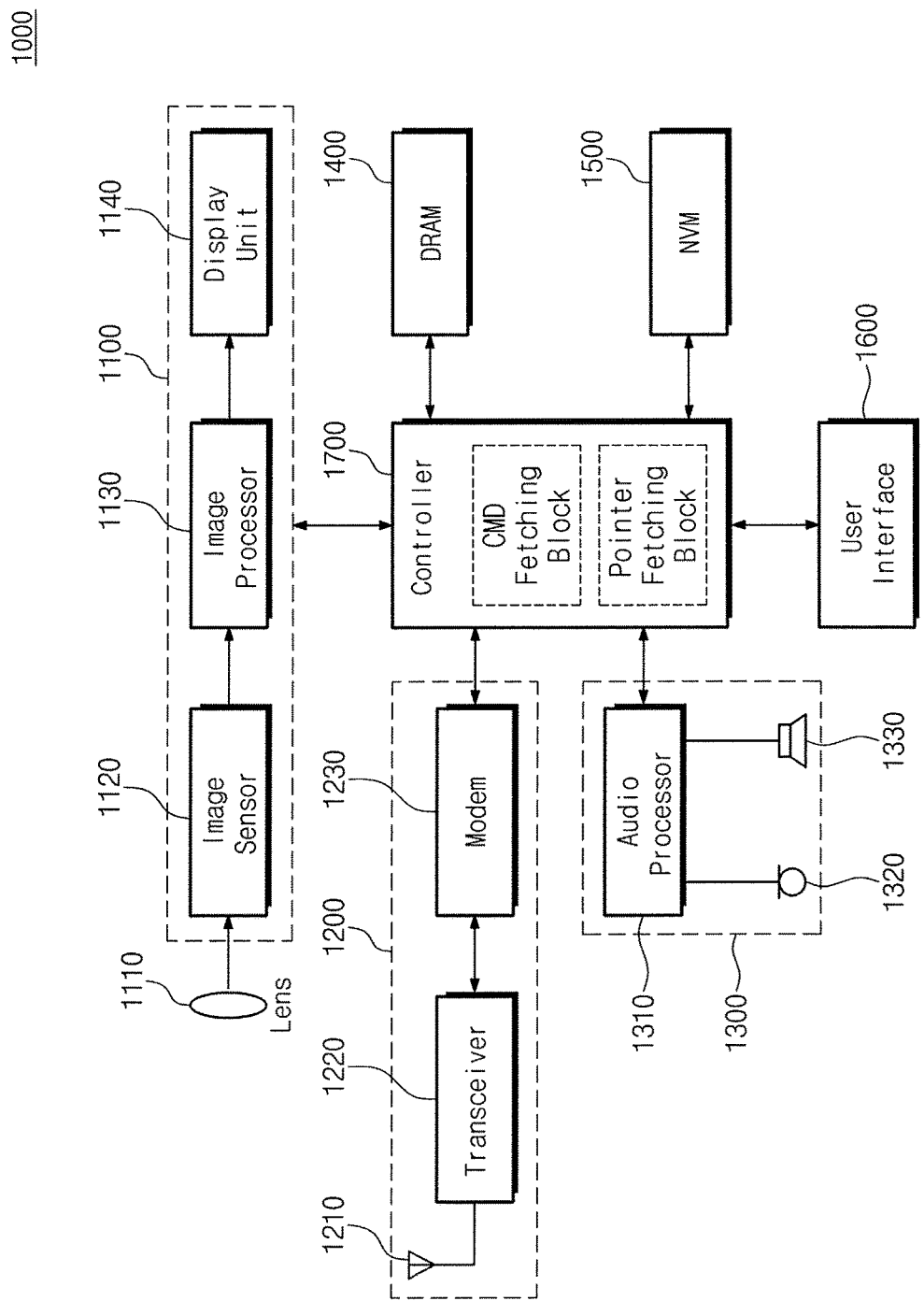
FIG. 12 is a block diagram illustrating a portable terminal applying a data processing method according to exemplary embodiments of the inventive concept.

FIG. 12 is a block diagram illustrating a portable terminal applying a data processing method according to exemplary embodiments of the inventive concept. Referring to FIG. 12, a portable terminal 1000 may include, for example, an image processing unit 1100, a wireless transmission/reception unit 1200, an audio processing unit 1300, a DRAM 1400, a nonvolatile memory device 1500, a user interface 1600, and a controller 1700.

The image processing unit 1100 may include, for example, a lens 1110, an image sensor 1120, an image processor 1130, and a display unit 1140. The wireless transmission/reception unit 1200 may include, for example, an antenna 1210, a transceiver (e.g., an RF unit) 1220, and a modem 1230. The audio processing unit 1300 may include, for example, an audio processor 1310, a microphone 1320, and a speaker 1330. The DRAM 1400 may temporarily store data being processed in the portable terminal 1000. The nonvolatile memory device 1500 may be provided by a memory card such as, for example, an MMC, eMMC, SD, or microSD memory card.

The controller 1700 may be, for example, a system-on-chip (SoC) driving an application program, an operating system, etc. The controller 1700 may include a command fetching block and a pointer fetching block to process data. A kernel of an operating system being driven in an SoC may include an input/output scheduler and a device driver for controlling the nonvolatile memory device 1500. The device controller may control access performance of the nonvolatile memory device 1500 or control a CPU mode, a DVFS level, etc. inside the SoC with reference to the number of sequence queues being managed in the input/output scheduler.

The nonvolatile memory device 1500 and/or the memory controller may be mounted using various types of packages such as, for example, PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), wafer-level processed stack package (WSP), etc.

According to exemplary embodiments of the inventive concept, a data storage device capable of effectively processing data based on the property of a command and a pointer being fetched from a host device is provided.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of operating a data storage device, comprising:
fetching a first plurality of commands from at least one submission queue generated in a host memory, wherein the first plurality of commands are fetched via an interface that connects the data storage device to the host memory, and that enables communication between the data storage device and the host memory;
determining whether a ratio of a second plurality of commands from among the fetched first plurality of commands exceeds a reference ratio, wherein the second plurality of commands has a same property;
adjusting a number of a plurality of pointers being fetched via the interface at substantially a same time based on determining whether the ratio exceeds the reference ratio,
wherein the plurality of pointers indicates a related address of the host memory corresponding to the first plurality of commands,
wherein the data storage device comprises a storage controller configured to perform an interfacing operation with a host comprising the host memory via the interface,
wherein, when a fetched command is related to a read operation, a space indicated by a corresponding pointer is secured in the host memory; and
transferring data from the data storage device to the space secured in the host memory when the fetched command is related to the read operation.

2. The method of claim 1, wherein the number of the plurality of pointers being fetched at substantially the same time is reduced in response to determining that the same property corresponds to a write operation.

3. The method of claim 2, wherein an order of the plurality of pointers being fetched is determined based on a size of data corresponding to the plurality of pointers being fetched.

4. The method of claim 3, wherein a pointer from among the plurality of pointers corresponding to a relatively small amount of data is preferentially fetched before a pointer from among the plurality of pointers corresponding to a relatively large amount of data is fetched.

5. The method of claim 3, wherein a pointer from among the plurality of pointers corresponding to a command relating to the read operation is fetched before a pointer from among the plurality of pointers corresponding to a command relating to the write operation is fetched.

6. The method of claim 1, wherein the number of the plurality of pointers being fetched at substantially the same time is increased in response to determining that the same property corresponds to the read operation.

7. The method of claim 6, wherein an order of the plurality of pointers being fetched is determined based on a size of data corresponding to the plurality of pointers being fetched.

8. The method of claim 7, wherein a pointer from among the plurality of pointers corresponding to a relatively large amount of data is preferentially fetched before a pointer from among the plurality of pointers corresponding to a relatively small amount of data is fetched.

9. The method of claim 7, wherein a pointer from among the plurality of pointers corresponding to a command relating to a write operation is fetched after fetching a pointer from among the plurality of pointers corresponding to a command relating to the read operation.

10. The method of claim 1, wherein the number of the plurality of pointers being fetched at substantially the same time is increased in response to determining that the same property is not related to the read operation or a write operation.

11. A storage device, comprising:
a controller; and
a nonvolatile memory storing a firmware that, when executed by the controller, causes the controller to;
fetch a first plurality of commands from at least one submission queue generated in a host memory, wherein the first plurality of commands are fetched via an interface circuit that connects the storage device to the host memory, and that enables communication between the storage device and the host memory;
determine whether a ratio of a second plurality of commands from among the fetched first plurality of commands exceeds a reference ratio, wherein the second plurality of commands has a same property; and
adjust a number of a plurality of pointers being fetched via the interface circuit at substantially a same time based on determining whether the ratio exceeds the reference ratio,
wherein the plurality of pointers indicates a related address of the host memory corresponding to the first plurality of commands,
wherein the fetched command is related to a read operation or a write operation,
wherein, when the fetched command is related to the read operation, a first space indicated by a corresponding pointer is secured in the host memory, and first data is transferred from the storage device to the first secured space,
wherein, when the fetched command is related to the write operation, a second space indicated by a corresponding pointer is secured in the host memory, and second data to be transferred to the nonvolatile memory is stored in the second secured space.

12. The storage device of claim 11, wherein the firmware, when executed by the controller, further causes the controller to fetch a reduced number of the plurality of pointers at substantially a same time, in response to determining that the same property corresponds to the write operation.

13. The storage device of claim 12, wherein an order of the plurality of pointers being fetched is determined based on a size of data corresponding to the plurality of pointers being fetched.

14. The storage device of claim 11, wherein the firmware, when executed by the controller, further causes the controller to fetch an increased number of the plurality of pointers at substantially a same time, in response to determining that the same property corresponds to the read operation.

15. The storage device of claim 14, wherein an order of the plurality of pointers being fetched is determined, based on a size of data corresponding to the plurality of pointers being fetched.

16. A method of operating a storage device, comprising:
fetching, via an interface circuit in a controller, a first plurality of commands from at least one submission queue generated in a host memory, wherein the interface circuit connects the storage device to the host memory and enables communication between the storage device and the host memory;
determining, by the controller, whether a ratio of a second plurality of commands from among the fetched first plurality of commands exceeds a reference ratio, wherein the second plurality of commands has a same property;
adjusting, by the controller, a number of pointers being fetched via the interface circuit at substantially a same time based on determining whether the ratio exceeds the reference ratio;
fetching, via an interface circuit, the adjusted number of the pointers at substantially a same time from the host memory; and
performing at least one of a write operation and a read operation on a nonvolatile memory by accessing, by the controller, the nonvolatile memory based on the fetched-adjusted number of the pointers,
wherein the pointers indicate related addresses corresponding to spaces secured in the host memory, and the at least one of the write operation and the read operation are performed using the secured spaces in the host memory.

17. The method of claim 16, wherein, when the write operation is performed on the nonvolatile memory, data to be transferred to the nonvolatile memory is stored in one of the secured spaces of the host memory indicated by the pointers.

18. The method of claim 16, wherein, when the read operation is performed on the nonvolatile memory, data read from the nonvolatile memory is stored in one of the secured spaces of the host memory indicated by the pointers.

19. The method of claim 16, wherein a firmware stored in the nonvolatile memory, when executed by the controller, further causes the controller to fetch a reduced number of the plurality of pointers at substantially a same time, in response to determining that the same property corresponds to a write operation.

20. The method of claim 16, wherein a firmware stored in the nonvolatile memory, when executed by the controller, further causes the controller to fetch an increased number of the plurality of pointers at substantially a same time, in response to determining that the same property corresponds to a read operation.

* * * * *